United States Patent
Wang et al.

(10) Patent No.: US 8,503,928 B2
(45) Date of Patent: Aug. 6, 2013

(54) METHOD AND SYSTEM FOR BEAMFORMING TRAINING AND COMMUNICATIONS APPARATUSES UTILIZING THE SAME

(75) Inventors: Chao-Chun Wang, Taipei (TW); Yuh-Ren Jauh, TaoYuan (TW); Yung Ping Hsu, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 570 days.

(21) Appl. No.: 12/480,828

(22) Filed: Jun. 9, 2009

(65) Prior Publication Data

US 2009/0318091 A1    Dec. 24, 2009

Related U.S. Application Data

(60) Provisional application No. 61/073,425, filed on Jun. 18, 2008.

(51) Int. Cl.
*H04B 7/165* (2006.01)

(52) U.S. Cl.
USPC .......................................... 455/23; 455/101

(58) Field of Classification Search
USPC ................ 455/456.6, 456.5, 23, 24, 575.7, 455/205; 375/346, 347, 334, 329
See application file for complete search history.

(56) References Cited

U.S. PATENT DOCUMENTS

| | | | |
|---|---|---|---|
| 7,418,053 B2 | 8/2008 | Perlman et al. | |
| 2007/0121751 A1 | 5/2007 | Li et al. | |
| 2007/0253501 A1* | 11/2007 | Yamaura | 375/262 |
| 2008/0130778 A1 | 6/2008 | Xia et al. | |

FOREIGN PATENT DOCUMENTS

| | | |
|---|---|---|
| CN | 1853374 | 10/2006 |
| EP | 1187410 | 3/2002 |
| JP | 11252614 | 9/1999 |
| JP | 2004364320 | 12/2004 |
| KR | 2006-48988 | 5/2006 |
| WO | 2005015844 | 2/2005 |
| WO | 2006031540 | 3/2006 |
| WO | 2008152566 | 12/2008 |

OTHER PUBLICATIONS

English Abstract of JP11252614 (published Sep. 17, 1999).
English Abstract of JP2004364320 (published Dec. 24, 2004).

* cited by examiner

*Primary Examiner* — Tu X Nguyen
(74) *Attorney, Agent, or Firm* — McClure, Qualey & Rodack, LLP

(57) ABSTRACT

A communications system including communications devices is provided. A communications device, a trainer, generates at least one concatenated training sequence, transmits the at least one concatenated training sequence, and receives one or more response messages describing corresponding channel characteristics from at least one of the rest of the plurality of communications devices. One or more of the rest of the plurality of communications devices, trainees, each receives the at least one concatenated training sequence, determines channel characteristics between the trainer and a trainee according to the at least one received concatenated training sequence, embeds channel characteristics information to generate at least one of the response messages, and transmits the response message.

13 Claims, 4 Drawing Sheets

300

METHOD AND SYSTEM FOR BEAMFORMING TRAINING AND COMMUNICATIONS APPARATUSES UTILIZING THE SAME

CROSS REFERENCE TO RELATED APPLICATIONS

This application claims the benefit of U.S. Provisional Application No. 61/073,425 filed Jun. 18, 2009 and entitled "Concatenated training sequence for beamforming". The entire contents of which are hereby incorporated by reference.

BACKGROUND OF THE INVENTION

1. Field of the Invention

The invention relates to a beamforming training method for concurrently beamforming training one or more communications devices in a communications system.

2. Description of the Related Art

Beamforming techniques that use multiple antennas at both the transmitter and receiver ends may be applied in a communications system to improve communications performance. Generally, the communications devices employing multiple antennas need to be trained in order to obtain optimum Tx and/or Rx antenna configurations before data transmission. For a conventional beamforming training procedure, a communications device transmits one or more predetermined beamforming training bit-sequences to a peer communications device. Then, the peer communications device receives at least one of the predetermined beamforming training bit-sequences and evaluates the channel characteristics by using the received bit-sequence(s), then returns the evaluation result to the communications device that transmitted the predetermined bit-sequences. However, the conventional beamforming training procedure is a one-to-one training procedure. Particularly, for high frequency applications, such as a millimeter wave communications system, only one communications device is preferable to be trained in a training session due to antenna directionality.

Based on the conventional beamforming training method, when there are more than one communications device in a communications system, a great number, which amount to the square of the number of the communications devices, of sessions and messages are required for the training procedure, which seriously degrades training efficiency. Thus, a novel beamforming training method that is able to solve the foregoing inefficiencies is highly required.

BRIEF SUMMARY OF THE INVENTION

Communications system and methods for beamforming training one or more trainee communications devices by a trainer communications device in a communications system are provided. An embodiment of a communications system comprises a plurality of communications devices. A communications device, a trainer, generates at least one concatenated training sequence, transmits the at least one concatenated training sequence, and receives one or more response messages describing corresponding channel characteristics from at least one of the rest of the plurality of communications devices. One or more of the rest of the plurality of communications devices, trainees, each receives the at least one concatenated training sequence, determines channel characteristics between the trainer and a trainee according to the at least one received concatenated training sequence, embeds channel characteristics information to generate at least one of the response messages, and transmits the response message.

An embodiment of a method for beamforming training one or more trainee communications devices by a trainer communications device in a communications system comprises: obtaining a training sequence; preparing a plurality of schemes; modulating the training sequence and generating a plurality of modulated training sequences by using the plurality of schemes in accordance with a predetermined rule; concatenating the plurality of modulated training sequences to form a concatenated training sequence; and transmitting the concatenated training sequence at least once to the one or more trainee communications devices.

Another embodiment of a method for beamforming training one or more communications devices in a communications system comprises: receiving at least one concatenated training sequence, wherein the at least one concatenated training sequence is generated by concatenating a plurality of modulated training sequences, and wherein the plurality of modulated training sequences are generated by modulating a predetermined training sequence with a plurality of schemes according to a predetermined rule; retrieving channel characteristics according to the received at least one concatenated training sequence to obtain a training result; generating at least one response message according to the training result; and transmitting the response message.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
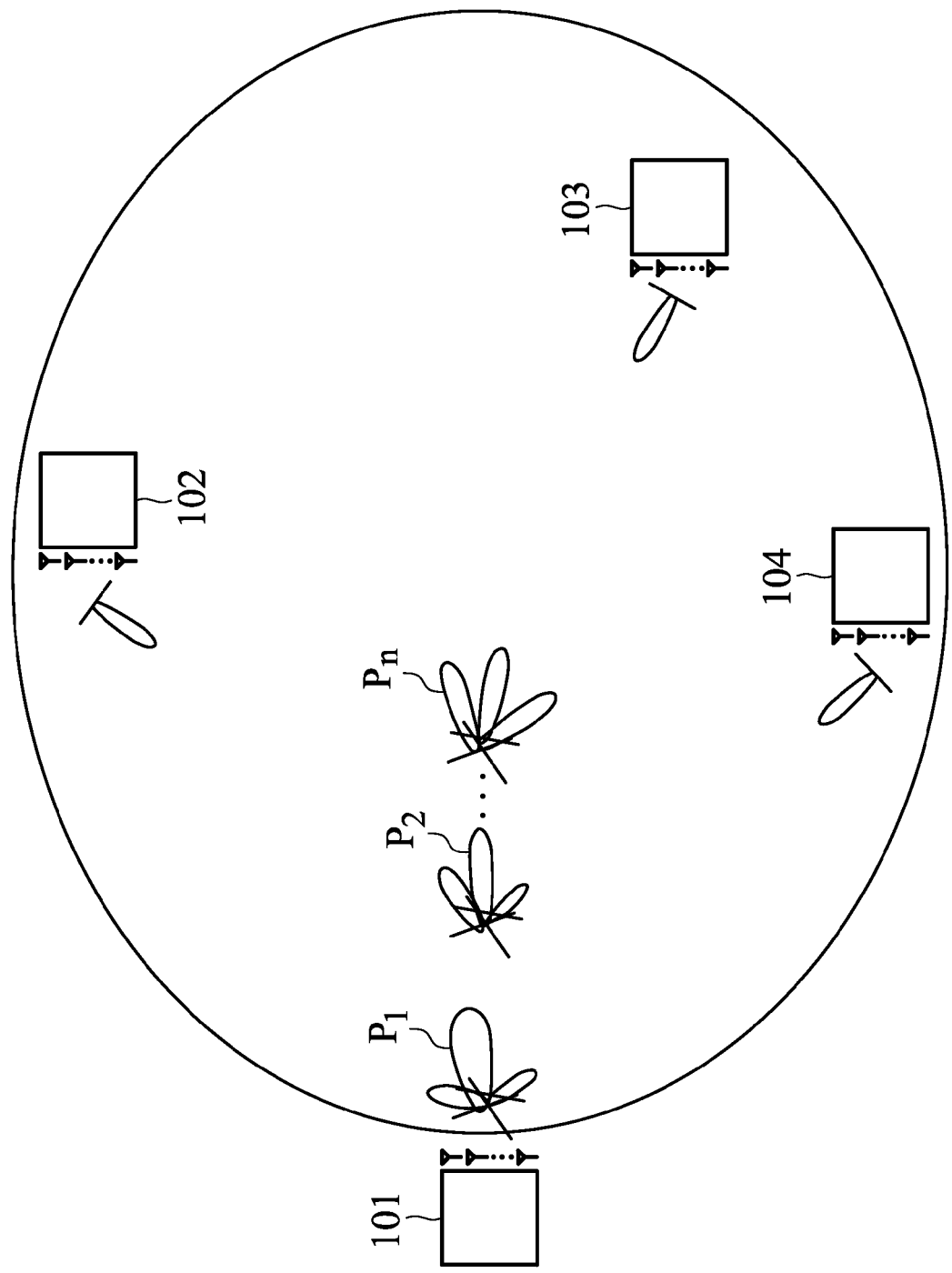
FIG. 1 shows a communications system according to an embodiment of the invention.

FIG. 1 shows a communications system according to an embodiment of the invention. A communications system 100 comprises a plurality of communications devices, for example, the communications devices 101-104. According to an embodiment of the invention, one of the communications devices may detect the presence of one or more of the other communications device(s). Any of the communications devices in the communications system 100 may act as the trainer communications device. The other communications devices within the reach of the transmitting signal, which includes the target communications device that the trainer communications device plans to train, may be the trainee communications devices. According to an embodiment of the invention, one-to-many beamforming training may be accomplished during one training session. In other words, one or more trainee communications devices may be concurrently trained during one training session.

Figure 2:
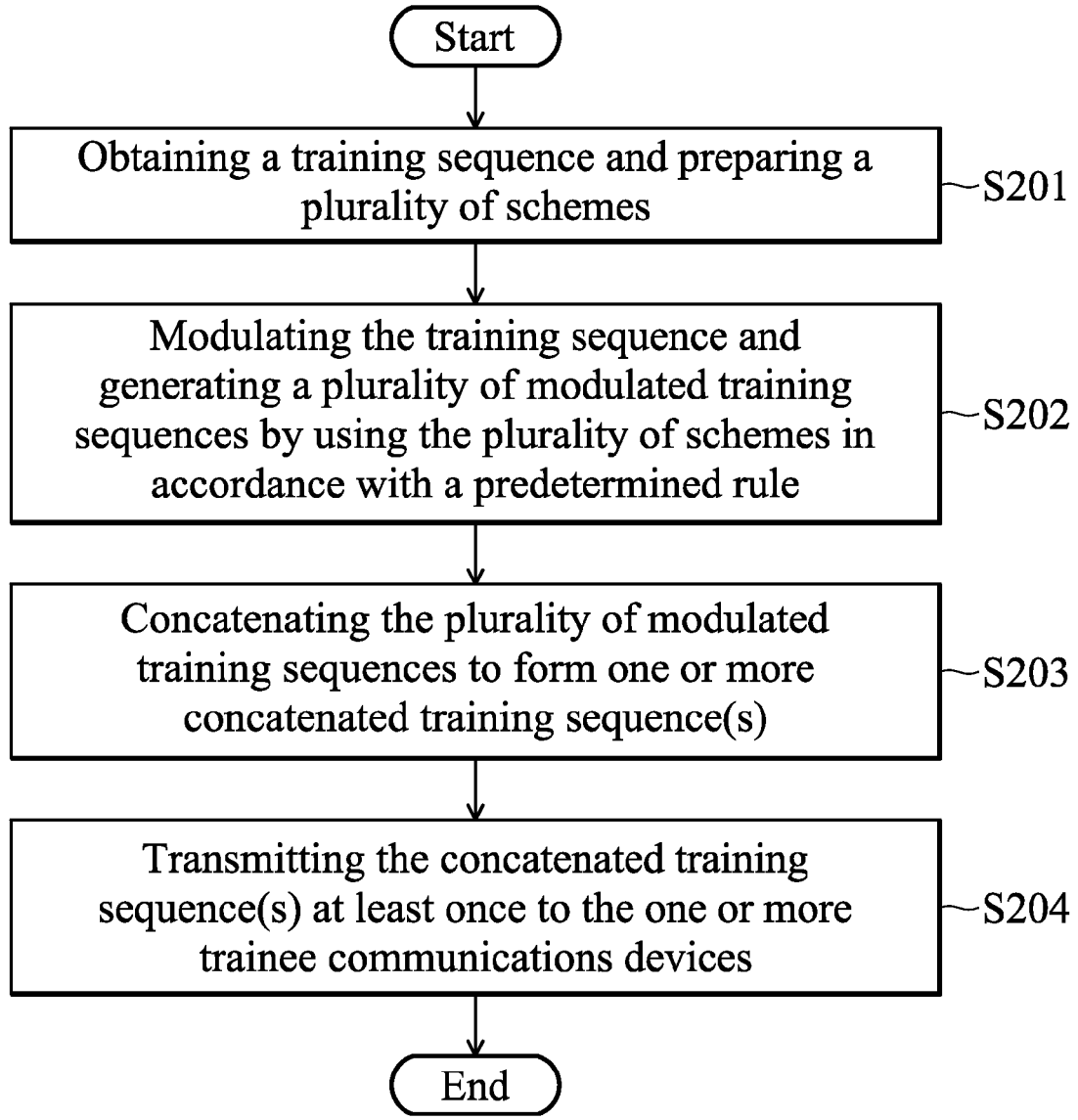
FIG. 2 shows a flow chart of a method for beamforming training one or more trainee communications devices by a trainer communications device in a communications system according to an embodiment of the invention.

FIG. 2 shows a flow chart of a method for beamforming training one or more trainee communications devices by a trainer communications device in a communications system according to an embodiment of the invention. The trainer communications device obtains a training sequence and prepares a plurality of schemes (Step S201). Next, the trainer communications device modulates the training sequence and generates a plurality of modulated training sequences by using the plurality of schemes in accordance with a predetermined rule (Step S202). Finally, the trainer communications device concatenates the plurality of modulated training sequences to form one or more concatenated training sequence (Step S203) and transmits the concatenated training sequence(s) at least once to the one or more trainee communications devices (Step S204).

Figure 3:
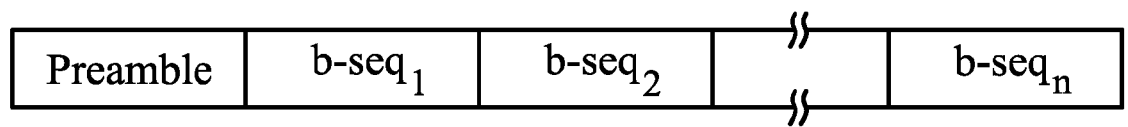
FIG. 3 shows an exemplary concatenated training sequence according to an embodiment of the invention.

According to an embodiment of the invention, the training sequence may be modulated by using different schemes according to the predetermined rule so as to carry different information. As an example, each of the plurality of modulated training sequences may carry information pertinent to corresponding channel characteristics between the one or more trainee communications devices and the trainer communications device. The channel characteristics may comprise the antenna configurations of the trainer communications device. FIG. 3 shows an exemplary concatenated training sequence according to an embodiment of the invention. The concatenated training sequence 300 may comprise a preamble and a plurality of modulated training sequences b-seq$_1$, b-seq$_2$, . . . b-seq$_n$. Details of the method for modulating the training sequence by using different schemes will be described in the following paragraphs.

According to an embodiment of the invention, the trainer communications device (such as the communications device 101) may modulate the training sequence by using different antenna weighting vectors (AWVs) associated with different transmitting beam patterns. As an example, the trainer communications device may modulate the training sequence according to an orthogonal matrix. The orthogonal matrix may be, for example, a discrete Fourier matrix, a Hadamard matrix, and the likes. A discrete Fourier matrix may be defined as follows $$\begin{bmatrix} \varpi^0 & \varpi^1 & \varpi^{n-1} \\ \varpi^0 & \varpi^2 & \varpi^{2(n-1)} \\ \vdots & & \\ \vdots & & \\ \varpi^0 & \varpi^n & \varpi^{n(n-1)} \end{bmatrix}, \quad \text{Eq. 1}$$

where $\varpi^k = (e^{-2\pi/n})^k$, n is the number of antennas of the trainer communications device and $\varpi^0 = \varpi^n = \ldots \varpi^{nn} = 1$. It should be noted that the discrete Fourier matrix and the Hadamard matrix are introduced here as examples. As one of ordinary skill in the art will readily appreciate, there are other orthogonal matrixes, and the invention should not be limited thereto.

According to the embodiment of the invention, the trainer communications device may individually apply one column vector of the orthogonal matrix to the training sequence so as to obtain one of the plurality of modulated training sequences b-seq$_1$, b-seq$_2$, . . . b-seq$_n$. The training sequence may be scaled by the column vectors of the orthogonal matrix so as to adjust the amplitude and/or phase of the training sequence before being transmitted. Applying different column vectors may result in different transmitting beam patterns, such as the beam patterns $P_1, P_2 \ldots P_n$ as shown in FIG. 1.

According to another embodiment of the invention, the trainer communications device may also modulate the training sequence by using a predetermined code book. The predetermined code book may comprise a plurality of AWVs depicting the characteristics of one or more transmitting beams, such as antenna direction or antenna gain pattern. The trainer communications devices may modulate the training sequence by applying different AWVs each associated with a specific transmitting beam pattern, such as the beam patterns $P_1, P_2 \ldots P_n$ as shown in FIG. 1, to the training sequence to obtain the plurality of modulated training sequences. According to an embodiment of the invention, the transmitting beam pattern may be determined according to at least one of the parameters comprising: phase and strength of transmitting signals, and number of antennas, placement of the antennas and individual transmitting beam pattern of each antenna element of the trainer communications device. According to the embodiment of the invention, the predetermined codes may further be the shared information between the trainer communications device (such as the communications device 101) and the trainee communications devices (such as the communications device 102-104).

According to another embodiment of the invention, the trainer communications device may also obtain a plurality of modulation schemes, and modulate the training sequence by using different modulation schemes in accordance with the predetermine rule. As an example, the trainer communications device may modulate the training sequence by using different physical rates or code rates to obtain the plurality of modulated training sequences. The predetermine rule may specify a first physical rate for the first modulated training sequence b-seq$_1$ and a second physical rate for the remaining of the training sequences b-seq$_2$ to b-seq$_n$. As another example, the trainer communications device may modulate the training sequence by using increasing physical rates to obtain the plurality of modulated training sequences.

After obtaining the plurality of modulated training sequences as previously described, the trainer communications device concatenates the plurality of modulated training sequences to form one or more concatenated training sequences (as the concatenated training sequence 300 shown in FIG. 3), and transmit the concatenated training sequence at least once to the one or more trainee communications devices. According to an embodiment of the invention, the transmission of the one or more concatenated training sequences may be carried out by using a method where at least one of the one or more concatenated training sequences are receivable by the trainee communications devices within the reach of the transmitting signal. As an example, the method may be: broadcasting one omni-directional concatenated training sequence, or transmitting the one or more concatenated training sequences to corresponding predetermined regions. Each region has an angle less than 360°.

Figure 4:
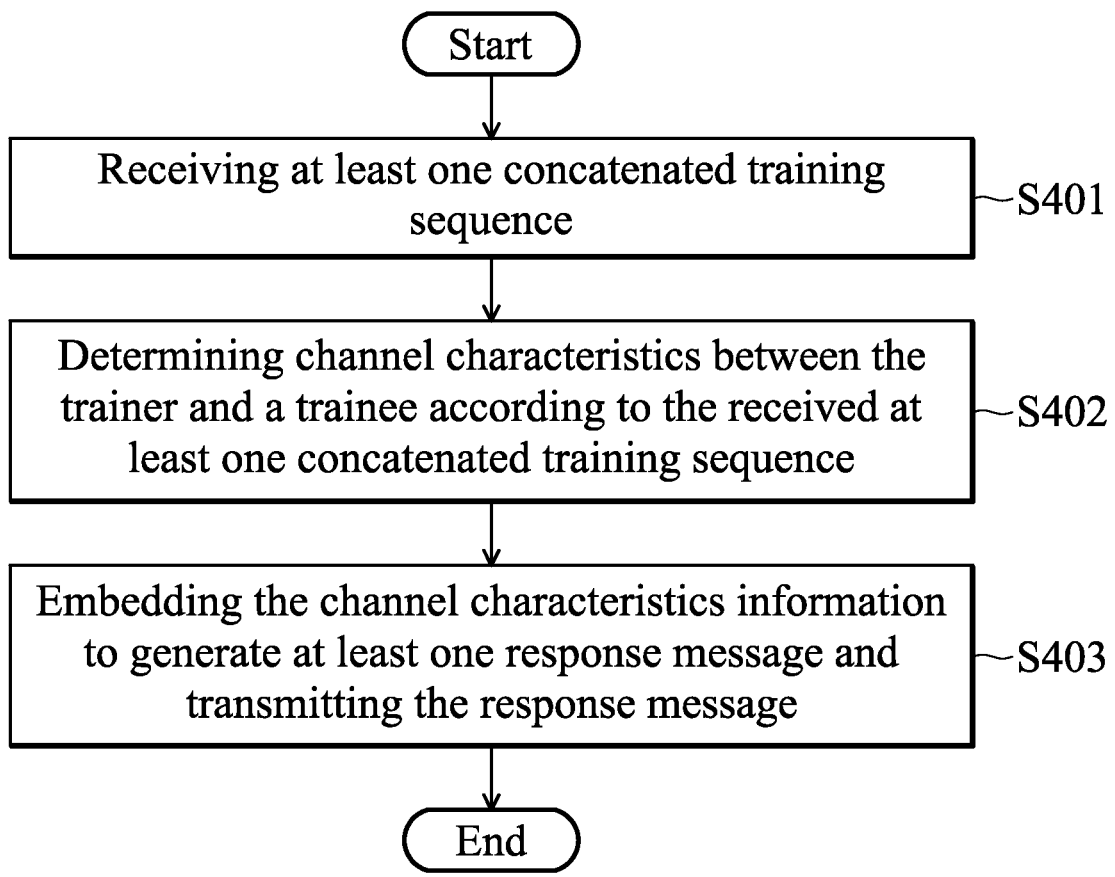
FIG. 4 shows another flow chart of the beamforming training method, at the trainee communications devices ends, according to an embodiment of the invention.

FIG. 4 shows another flow chart of the beamforming training method, at the trainee communications devices ends, according to an embodiment of the invention. After at least one concatenated training sequence has been transmitted by a trainer communications device, the one or more trainee communications devices (such as the communications device 102-104) receive at least one concatenated training sequence for beamforming training (Step S401). Next, the one or more trainee communications devices determine the channel characteristics between the one or more trainee communications devices and the trainer communications device according to the received at least one concatenated training sequence (Step S402). Finally, the one or more trainee communications devices embed channel characteristics information to generate at least one response message and transmit the response message (Step S403).

According to an embodiment of the invention, the channel characteristics retrieved according to the received concatenated training sequence may include a combination of an antenna direction, a phase rotating vector of the antenna, an optimum antenna configuration . . . and so on. As an example, the one or more trainee communications devices may compute a weighting vector that maximizes the signal to noise ratio as the training result according to the received at least one concatenated training sequence, and respond with the training result to the trainer communications device. As another example, the one or more trainee communications devices retrieve an optimum antenna code as the training result according to the received at least one concatenated training sequence, and respond the training result to the trainer communications device.

According to the embodiment of the invention, the beamforming training session may be completed after the trainer communications device receives the one or more response messages describing corresponding channel characteristics from at least one of the plurality of trainee communications devices. Based on the proposed beamforming training method, the trainer communications devices may concurrently train many trainee communications devices during one training session so that one-to-many beamforming training is realized.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications system, comprising:
a plurality of communications devices, wherein
a communications device, a trainer, generates at least one concatenated training sequence, transmits the at least one concatenated training sequence for performing one-to-many beamforming training during one training session, and receives one or more response messages describing corresponding channel characteristics from at least one of the rest of the plurality of communications devices, wherein the communications device, the trainer, generates the at least one concatenated training sequence by obtaining a training sequence, modulating the training sequence by using different schemes according to a predetermined rule so as to obtain a plurality of modulated training sequences, and concatenating the modulated training sequences to obtain the concatenated training sequence; and
one or more of the rest of the plurality of communications devices, trainees, each receives the at least one concatenated training sequence, determines the channel characteristics between the trainer and a trainee according to the at least one received concatenated training sequence, embeds channel characteristics information to generate at least one of the response messages, and transmits the response message.

2. The communications system as claimed in claim 1, wherein the training sequence is modulated by different schemes according to a predetermined rule so as to carry different information.

3. The communications system as claimed in claim 2, wherein the communications device, the trainer, modulates the training sequence by using column vectors of an orthogonal matrix to scale the training sequence.

4. The communications system as claimed in claim 2, wherein the communications device, the trainer, modulates the training sequence by applying different antenna weighting vectors each associated with a specific transmitting beam pattern to the training sequence.

5. The communications system as claimed in claim 4, wherein the transmitting beam pattern is determined according to at least one of the parameters comprising phase and strength of transmitting signals, number of antennas, placement of the antennas and individual transmitting beam pattern of each antenna of the one of the plurality of communications devices.

6. The communications system as claimed in claim 2, wherein the communications device, the trainer, modulates the training sequence according to different modulation schemes or using different code rates.

7. The communications system as claimed in claim 2, wherein the communications device, the trainer, modulates the training sequence with increasing physical rates.

8. The communications system as claimed in claim 1, wherein the channel characteristics comprise an optimum antenna configuration retrieved according to the received concatenated training sequence.

9. A method for one-to-many beamforming training during one training session in a communications system, comprising:
receiving at least one concatenated training sequence, wherein the at least one concatenated training sequence is generated by concatenating a plurality of modulated training sequences, and wherein the plurality of modulated training sequences are generated by modulating a predetermined training sequence with a plurality of schemes according to a predetermined rule;
retrieving channel characteristics according to the received at least one concatenated training sequence to obtain a training result;
generating at least one response message according to the training result; and
transmitting the response message.

10. The method as claimed in claim 9, wherein the plurality of modulated training sequences are generated according to different antenna configurations.

11. The method as claimed in claim 9, wherein the plurality of modulated training sequences are generated by applying different antenna weighting vectors each associated with a specific transmitting beam pattern to the predetermined training sequence.

12. The method as claimed in claim 9, wherein the plurality of modulated training sequences are generated by using different modulation schemes or different code rates.

13. The method as claimed in claim 9, wherein the channel characteristics comprise an optimum antenna configuration retrieved according to the received concatenated training sequence.

* * * * *